(12) United States Patent
Bishop

(10) Patent No.: US 10,485,345 B2
(45) Date of Patent: Nov. 26, 2019

(54) ATTACHMENT DEVICE

(71) Applicant: MAGRAK LTD., Worcester (GB)

(72) Inventor: Jason Bishop, Worcester (GB)

(73) Assignee: MAGRAK LTD., Worcestershire, Worcester (GB)

( * ) Notice: Subject to any disclaimer, the term of this patent is extended or adjusted under 35 U.S.C. 154(b) by 0 days.

(21) Appl. No.: 15/760,300

(22) PCT Filed: Sep. 9, 2016

(86) PCT No.: PCT/IB2016/055377
§ 371 (c)(1),
(2) Date: Mar. 15, 2018

(87) PCT Pub. No.: WO2017/046682
PCT Pub. Date: Mar. 23, 2017

(65) Prior Publication Data
US 2018/0271282 A1    Sep. 27, 2018

(30) Foreign Application Priority Data
Sep. 19, 2015    (GB) .................................. 1516629.1

(51) Int. Cl.
*A47B 96/06* (2006.01)
*B25H 5/00* (2006.01)
(Continued)

(52) U.S. Cl.
CPC ............ *A47B 96/068* (2013.01); *A47B 96/06* (2013.01); *A47B 96/14* (2013.01); *B25H 3/04* (2013.01);
(Continued)

(58) Field of Classification Search
CPC ....... A47B 96/068; A47B 96/14; A47B 96/06; F16B 1/00; F16B 2001/0035; B60R 11/06; B60R 2011/0057; B25H 3/04; B25H 5/00
See application file for complete search history.

(56) References Cited

U.S. PATENT DOCUMENTS 3,102,314 A * 9/1963 Alderfer ................. A41F 1/002
24/303
3,869,764 A * 3/1975 Umezu .............. A44B 18/0053
24/585.1

(Continued)

FOREIGN PATENT DOCUMENTS

| CZ | 20120303 | 11/2013 |
| GB | 932918 A | 7/1963 |

(Continued)

OTHER PUBLICATIONS

International Search Report and Written Opinion, European Patent Office Search Authority, PCT/IB2016/055377, dated Oct. 21, 2016.

*Primary Examiner* — Ko H Chan
(74) *Attorney, Agent, or Firm* — Workman Nydegger

(57) ABSTRACT

A device for attaching items to walls, ceilings etc. comprises a plurality of cells wherein each cell comprises a contact fixing and a coupling, and wherein each is attached to its neighbour by a means, such as a hinge or flexible joint, allowing articulation therebetween. The device further has a means for locking the articulation between adjacent cells. The contact fixing advantageously comprises one or more magnets, allowing the device to attach to suitable metals such as the side of a vehicle. The device allows a strong fixing to be obtained, from the combined fixing action of multiple cells, whilst allowing removal a single cell at a time. The invention further extends to an associated article—which may act as the means for locking the articu- (Continued)

lation—for attaching to the device, such as a shelf, rack or other item. The article may have attachment points arranged to couple to multiple cells, and, when attached, to maintain the cells in a fixed positional relationship to each other.

15 Claims, 4 Drawing Sheets

(51) Int. Cl.
*B25H 3/04* (2006.01)
*A47B 96/14* (2006.01)
*B60R 11/06* (2006.01)
*F16B 1/00* (2006.01)
*B60R 11/00* (2006.01)

(52) U.S. Cl.
CPC ............ *B25H 5/00* (2013.01); *B60R 11/06* (2013.01); *F16B 1/00* (2013.01); *B60R 2011/0057* (2013.01); *F16B 2001/0035* (2013.01)

(56) References Cited

U.S. PATENT DOCUMENTS

| | | | |
|---|---|---|---|
| 4,039,137 A | 8/1977 | Smith | |
| 4,258,493 A * | 3/1981 | Kettlestrings | A47G 1/17 24/339 |
| 4,509,219 A * | 4/1985 | Yagi | A47C 21/00 5/693 |
| 4,591,048 A * | 5/1986 | Eldridge, Jr. | A61B 17/06161 206/382 |
| 5,421,112 A * | 6/1995 | Knorr | G09F 7/04 160/135 |
| 5,601,271 A | 2/1997 | Janowski et al. | |
| 5,662,305 A | 9/1997 | Shimamura et al. | |
| 5,704,147 A * | 1/1998 | Rellinger | G09F 7/04 40/600 |
| 6,301,754 B1 * | 10/2001 | Grunberger | A41F 1/002 24/303 |
| 7,817,002 B2 * | 10/2010 | Fullerton | A45F 5/02 2/312 |
| 7,817,005 B2 * | 10/2010 | Fullerton | B25H 3/021 220/230 |
| 7,845,604 B2 * | 12/2010 | Connor, Jr. | A47F 5/08 211/85.23 |
| 8,302,929 B2 * | 11/2012 | Lanio | G09F 1/103 248/206.5 |
| 9,894,989 B2 * | 2/2018 | Kramer | A47F 5/0025 |
| 2006/0027719 A1 | 2/2006 | Klein | |
| 2009/0123233 A1 | 5/2009 | Herzogenrath | |
| 2010/0270246 A1 * | 10/2010 | Rodriguez | A47B 96/16 211/34 |
| 2014/0103169 A1 | 4/2014 | Heard et al. | |
| 2017/0129650 A1 * | 5/2017 | Karas | F16B 2/22 |

FOREIGN PATENT DOCUMENTS

GB          2483312          3/2012
KR       20110139998       12/2011

* cited by examiner

ATTACHMENT DEVICE

This application claims priority to PCT Application No. PCT/IB2016/055377, filed Sep. 9, 2016, entitled "ATTACHMENT DEVICE", which claims the benefit of and priority to United Kingdom Application No. 1516629.1, filed Sep. 19, 2015, entitled "ATTACHMENT DEVICE". All the aforementioned applications are incorporated by reference herein in their entirety.

The present invention relates to means for attaching or fixing items to a surface or substrate, such as a wall, ceiling or floor. More particularly, it relates to means for attaching items in a manner that allows for convenient placement and subsequent removal of the items and the attachment means from the substrate, whilst maintaining a strong attachment when supporting an item.

BACKGROUND

In workshops, sheds and vans and the like there is frequently the need to secure items to walls (e.g. in workshops etc.) or to the sides of vans to allow convenient and secure stowage. In vans and other vehicles in particular, tradespeople often need to have the tools and materials of their trade stowed in a manner that provides for convenient access, while being held securely enough to not present a hazard when the vehicle is in motion. Typically, a vehicle storage compartment may be lined with wooden panels to be used as a surface for attachment of brackets, hooks and similar fixings. This allows convenient attachment of shelving etc. to the panels.

However, such methods of attachment do have disadvantages. By lining the inside of a van with such (relatively thick) wooden (typically plywood) panels the volume available within the van is reduced, which may impact on the amount of materials able to be carried. Also, wooden panels are heavy, and the additional weight leads to increased fuel consumption of the vehicle. Wooden panels are also relatively expensive and time consuming to install. Furthermore, if the shelves that attach to fixings on the panels are removed, for example to provide more space for carrying large loads, the shelf attachment fixings, brackets and the like, will remain fixed to the wooden panels, which may present hazards when the fixings protrude into the storage volume.

Other approaches have been adopted to overcome some of these problems. One such approach is to use brackets or hooks that stick in some manner, such as using magnetic force, suction cups or sticky pads, to the surface such as a wall or side of a van. However, if the means for sticking the brackets to the surface is made strong enough to support shelving then it can be difficult to remove the brackets should it be required to do so.

Embodiments of the invention have the object of addressing one or more of the above shortcomings of the background art.

BRIEF SUMMARY OF THE DISCLOSURE

According to a first aspect of the invention there is provided an attachment device comprising a plurality of cells, wherein each cell comprises a contact fixing for attaching the cell to a substrate, and wherein each cell is attached to at least one neighbouring cell by a means allowing articulation therebetween, characterised in that the device comprises means for attaching an associated article thereto, and further comprises means for mechanically locking a cell to the next, to disable the articulation therebetween.

Advantageously, the means for mechanically locking each cell to the next may comprise a plurality of attachment means on the associated article, in a fixed relationship to each other, each being arranged to couple to the means for attaching the associated article on at least two of the cells.

Embodiments of the invention therefore provide an attachment device wherein a total fixing force is distributed between a plurality of cells, each one contributing to the device's ability to support further loads. The associated article, when attached to the attachment device, locks the articulation movement between respective cells, and so makes the individual cells act mechanically as a single, larger attachment.

Some embodiments may have an alternative means for locking the articulation between cells. For example, a removable pin or bar may be used that rigidly holds a cell in a fixed relationship to its neighbour. Alternatively, the articulation region between each cell may be lockable, e.g. using a rigid retaining strip or bar. Other means for releasably preventing articulation will be apparent to the normally skilled person.

The articulation, or hinging arrangement, between each of the cells allows for convenient removal of the whole device in stages, such as one cell at a time, whilst providing an attachment strength (due to the locking together of the cells) for supporting objects equal to the sum of the individual cell attachment strengths.

Note that the term "substrate" as used herein refers to the material or surface (such as a metal plate or sheet etc.) to which the device is attached by means of the contact fixing. Note also that the means for mechanically locking a cell to the next, to disable the articulation therebetween does not include the mere application of the device to the substrate, where the attachment to the substrate will, to some degree, prevent articulation. Instead, the means is a further means such as that discussed herein.

Embodiments of the invention also help to prevent, minimise or reduce damage to whatever substrate they attach to. Use of a contact attachment means, such as a magnetic field, obviates any requirement to drill holes into the substrate. Embodiments may also have appropriate coatings or be made from materials that are soft relative to the substrate, and so will tend not to cause damage by attachment and removal of the device.

Some embodiments of the invention may have cells connected with an articulated region that allows a degree of rotational movement of a cell about the articulation means. Thus, removal of the device from a substrate may be conveniently performed—once the articulation is unlocked—by, starting at a peripheral cell, rotating each cell away from the substrate to break its individual contact fixing, and then moving on to the next. By doing this for each cell in turn, the device is easily removed from a substrate.

Some embodiments may have the articulation between neighbouring cells provided by a pliable region of material between said cells. This also allows for convenient manufacture of the device, wherein neighbouring cells may be at least partially formed from a single piece of material, with the material being chosen to provide sufficient pliability between cells. It will be appreciated that the degree of pliability required should be sufficient to allow a cell to flex in relation to its neighbour when a removal force is applied to the cell, such that removal of one cell does not require the simultaneous removal of the neighbouring cell.

Some embodiments may be formed that have a body portion of each cell, along with articulated regions therebetween, formed from a single moulding.

Embodiments may alternatively be formed in other ways. For example, cells may be made individually, and coupled together e.g. using a pin or clip, to create a hinge therebetween.

Advantageously, the plurality of cells may be coupled together in the form of a linear strip. The strip may comprise an array of cells in a 1×n formation, where n is the number of cells in the strip. Embodiments will have at least two cells, and will typically comprise between 3 and 6 cells, but it will be appreciated that some applications may benefit from a greater number, such as 8, 10, 12, 15 or even more. The number of cells in any given embodiment may be chosen depending upon the characteristics of objects required to be attached to the device, the space available, or by other criteria that will be apparent to the normally skilled person.

Conveniently, some embodiments of the invention may have a handle attached to at least one of the cells. The handle may be located on a cell that connects only to one other cell, and so may provide a means for removing its associated cell from a substrate, and in turn the remaining cells.

Preferred embodiments of the invention have one or more magnetic elements, such as a magnet, in each cell to provide the contact fixing. Such embodiments are therefore suitable for attachment to any suitable ferromagnetic material, such as steel plate. The magnetic elements in each cell may be of a strength whereby it is relatively straightforward to remove the individual cell from the substrate, but strong enough so that, when considered along with the other cells in the device, provides a suitably strong attachment to the substrate.

The magnet is advantageously positioned within its respective cell so as to have a face coincident with a surface of the device. This then provides a convenient surface for attachment to substrates such as steel plates etc. This surface may be on a side of the device that is opposite a side having the means for attaching other objects thereto.

The magnet may conveniently be a neodymium magnet. The magnet may preferably have a grade between N30 and N52, although it will be appreciated that other magnetic grades, and other types of magnet, may be used dependent upon the particular application to which an embodiment is put.

The magnet may, in some embodiments, be at least partially covered in a material, such as a rubber, or other elastomeric material, or other material that has a high degree of friction upon the substrate. This therefore acts to increase resistance to slip, such as may particularly occur when the device is attached to a vertical wall or panel. Such a covering also helps to prevent damage, such as scratches, being imparted to substrates (which may for example be painted) when in use. The elastomeric material also helps protect the magnets against physical shock that can occur when attaching the device to a substrate, and also protects the magnets against moisture, condensation etc. Likewise, a surface of some embodiments additional to just the magnets may be similarly covered in such high-friction materials where the surface comes into contact with a substrate. Of course, some applications may not need a covering on the magnets, because for example the magnets may be set back a little within the body of the device, or because damage to the substrate from the device is not likely or not important, and so some embodiments may leave the magnets uncovered by such coatings.

The device may conveniently be made primarily from a material such as a low density polypropylene (LDPE). This allows convenient moulding of elements of the cells. The flexibility of such a material may, in some embodiments, also provide a degree of flexibility within each cell, which aids removal of a cell from the substrate. As mentioned above, it also allows convenient moulding of at least parts of multiple elements from a single moulding. Such a moulding may conveniently comprise a housing section of each cell, along with the articulated joins therebetween. The normally skilled person will appreciate that other materials may be used to make embodiments of the invention, and that certain materials may be more suitable in certain applications. Such material include, but are not limited to, thermoplastic elastomers, as well as more rigid thermoplastics. Of course, it will be appreciated that the articulation between adjacent cells can be created even when relatively rigid materials are used, by suitable design of the articulated region, e.g. using narrow strips or employing separate cells joined together, as described herein. In some embodiments, the cells may be separable from each other, and may be arranged to clip together to produce a strip or array of cells when in use. This allows greater numbers of cells to be combined as required.

The attachment means for attaching associated objects thereto may comprise a locating bar, or hook, or eye, or any other suitable means. The attachment means may be located on one or more cells of the device, or may be located separately, such as from a panel or region attached to a cell. Where the attachment means is incorporated into one or more cells of the device, then the attachment means may be moulded contemporaneously with other parts of the cell. Alternatively, the attachment means may be formed separately and attached by other means. This allows the attachment means to be formed from different materials, and also allows the attachment means to be replaced separately from the rest of the device, if, for example, it becomes worn or damaged. Some embodiments may have an attachment means formed from the same LDPE material as used in the main body of the cell, while other embodiments may instead use a high density polypropylene (HDPE), which provide benefits in being more hardwearing as compared to LDPE.

Some embodiments may have an attachment means comprising at least one lug, lip or keyway, or similar coupling, to which a corresponding cut-out, slot or aperture on an associated object may arranged to hook or lock into.

Some embodiments of the invention may have an attachment means located on each cell of the device. Each attachment means may be adapted to connect to separate associated objects, or alternatively, e.g. when the associated object is being used to lock the articulation between respective cells, to connect to separate parts of a single object.

Some embodiments of the invention may have an attachment means comprising similar couplings on each cell. Some embodiments may comprise a device as described above and further comprising a separate article or articles, such as a storage unit or other object, having couplings arranged to engage with a plurality of the couplings on the device. The couplings on the storage unit or other object(s) are advantageously in fixed relationship to each other. Thus when the device (which may be considered as a bracket) is attached to the object using more than a single cell, the object will act to lock the cells together, and so prevent any flexure therebetween whilst the object remains coupled thereto. This helps to prevent the device from being peeled, cell by cell, from the substrate, as the magnets on the connected cells will act as if on a rigid, unarticulated device.

Thus some embodiments of the invention comprise a device for attaching to a substrate, along with a unit or associated article designed to attach to the device. Accordingly, a second aspect of the invention provides, in combination, an article and a corresponding device for attaching said article to a substrate, wherein the device comprises a plurality of cells, wherein each cell comprises a contact fixing for attaching the cell to a substrate, and wherein each cell is attached to at least one neighbouring cell by a means allowing articulation therebetween, and wherein a plurality of cells of the device each further comprise a coupling arranged to engage with a corresponding coupling on the article.

The article may comprise a storage unit such as a shelf, cupboard, drawer, holster, rack, frame or similar unit, or may comprise a combination of such units. The article may comprise any other article suitable for attaching to such a device and having a coupling adapted to engage with the coupling on the device. For example, articles such as lamps, torches, fire extinguishers, first aid kits etc. may be adapted to have such a coupling. It will be apparent to the normally skilled person that this list of articles is not limiting, and that embodiments of the invention will also be clearly applicable to other items.

Coupling each cell to the article provides a benefit in that the weight of the storage unit is distributed across the full plurality of cells. Advantageously, the couplings on the article are in a fixed relationship to each other. This ensures that any force that the article puts on the plurality of cells of the attachment device will tend to be distributed in a substantially even, or linearly distributed, fashion, across the cells, and also acts to lock or disable the articulation of the cells. This helps to prevent the weight of the storage unit causing the attachment device to peel off, cell by cell.

In some embodiments, the attachment device may be arranged to preferably attach to a generally vertical substrate, and to attach with a major axis thereof also running generally vertically. Thus, the couplings will, in such an embodiment, run one above the other. Other embodiments may have the device running with its major axis running generally horizontally. Of course, it will be appreciated that the direction in which the device runs (vertical, horizontal, or diagonal etc.) may be chosen dependent upon such factors as the object(s) to be attached to the device, and upon the characteristics of the substrate.

According to a third aspect of the invention there is provided an attachment device adapted for use with the second aspect of the invention.

According to a fourth aspect of the invention there is provided a cell as described herein, that has means for coupling to another cell, to produce a device according to the first aspect of the invention.

BRIEF DESCRIPTION OF THE DRAWINGS

Embodiments of the invention are further described hereinafter, by way of example only, with reference to the accompanying drawings, in which.

DETAILED DESCRIPTION

Figure 1:
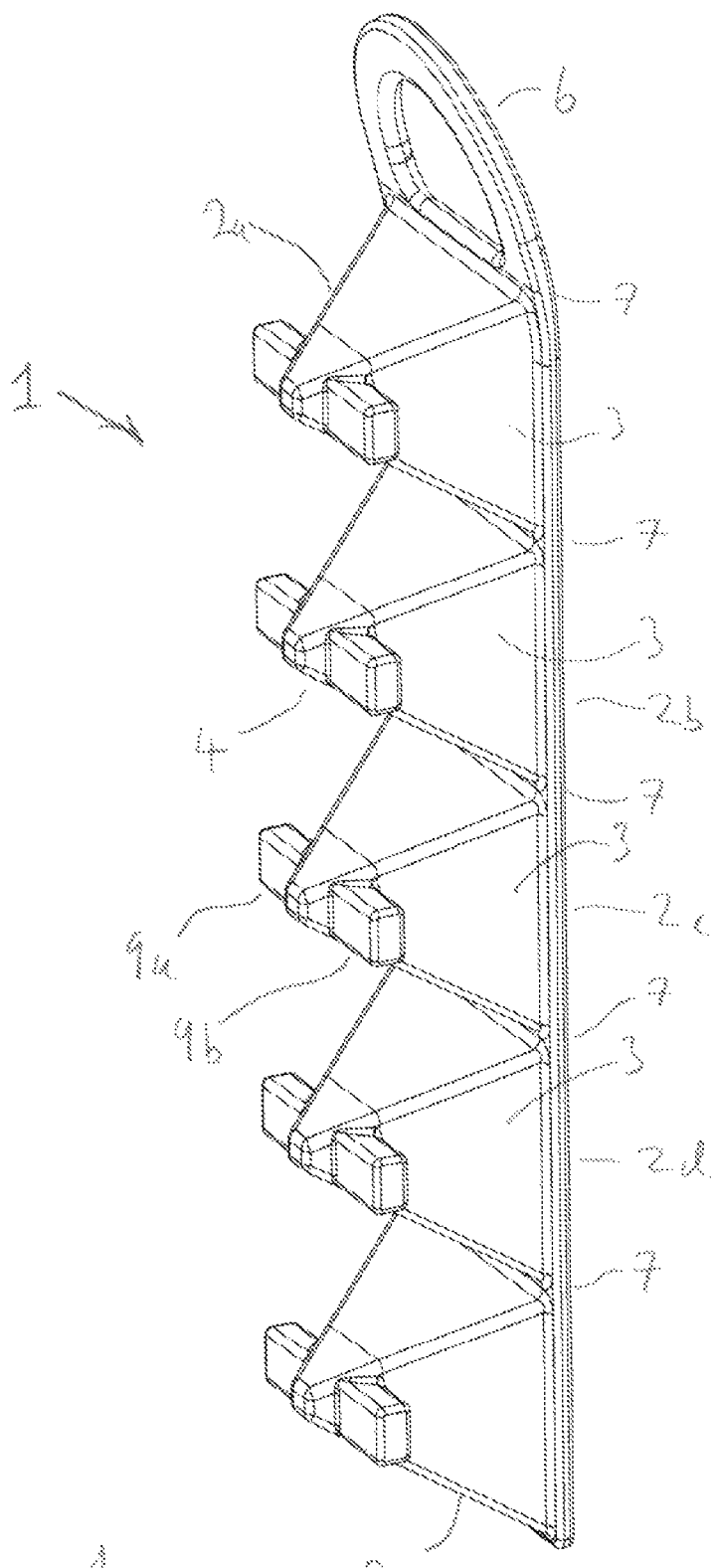
FIG. 1 diagrammatically illustrates a front three-quarters view of a first embodiment of the invention.
Figure 2:
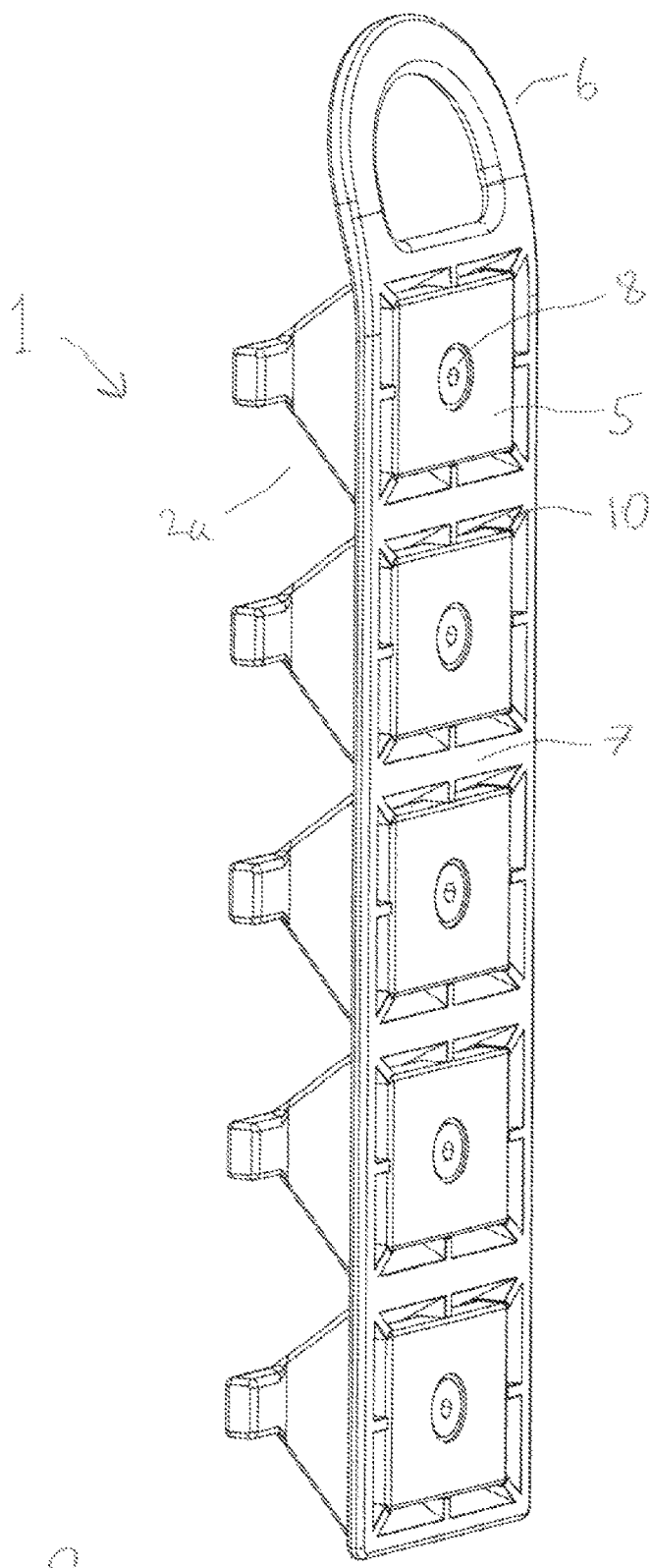
FIG. 2 diagrammatically illustrates a rear three quarters view of a first embodiment of the invention.

FIGS. 1 and 2 together show front and rear three-quarter views of a first embodiment of the present invention, comprising of an attachment device 1 having five cells 2*a-e*, arranged in a linear strip.

Each cell 2 comprises of a body 3 to which is fixed an attachment means 4 at a front side of the cell, and housing a magnet 5 at a rear side. The attachment means comprises a hook, or lug arrangement, formed as a keyway or pair of centrally mounted horizontal (when seen in a preferred mounting orientation) lugs 9*a,b* to which other items may be attached. The lug arrangement is attached to a central point of the body 3 and provides a horizontal projection each side of the central attachment point running parallel to a rear face of the body 3. A loop 6 is attached to a cell on an end of the strip. The bodies 3 of each of the five cells 2 along with the loop 6 are moulded as a single item from LDPE. The cells are separated from respective neighbours, and from the loop 6 by a thinner region 7 of LDPE that allows articulation between neighbouring cells, due to the natural pliability of the material. The attachment means 4 are also formed from LDPE.

The magnet 5 is a neodymium N42 magnet, of dimension approximately 37 mm×29 mm×5 mm and is coated in a rubber compound approximately 0.5 mm thick. A stainless steel Allan bolt 8 holds the magnet 5 in place in a seating 10 within the body 3 of the cell 2, and also holds the attachment means/hook 4 in place at the front of the cell. The magnet 5 is countersunk to prevent the bolt 8 from standing proud of the magnet. The magnet is seated so that an outwardly directed face thereof is approximately flush with a rear plane of the cell. This allows close contact with an attaching substrate, such as a steel sheet, so permitting a firm magnetic attachment. In use, the rubber coating on the magnet contacts the metal sheet to which it is attached. The friction between the rubber and metal sheet improves the resistance to being dragged, e.g. due to gravity, along or down the metal sheet. Of course, it will be understood by the normally skilled person that different magnets, of different sizes and strengths, may be used, according to a particular intended application.

In use, the strip 1 is laid onto a metal panel or plate in the position intended to hang or otherwise attach an associated storage unit etc. Care should be taken not to pinch one's hand when the magnets of the device pull the cells towards the metal panel. The articulated nature of the device means that each cell can be controlled as it attaches to the metal panel in-turn, which reduces the danger associated with the combined strength of the plurality of magnets making up the device. Once in position articles can be attached or hung from the attachment means 4.

The device may be removed from the metal plate to which it is attached by pulling the loop 6 generally perpendicularly away from the plate. This puts a separation force onto just the magnet in the cell 2*a* to which the loop is attached, and so only the attraction force of a single magnet onto the metal plate needs to be overcome. When sufficient force is applied to the loop 6, the cell 2*a* to which it is attached will lift, and pivot around the attachment 7 to the adjacent cell 2*b*. Further pulling on the loop will then in turn raise this next cell 2*b*, which pivots around its attachment to a third cell 2*c*. In this manner each cell lifts and pivots about its attachment to the next cell, until all cells 2*a-e* are raised clear from the metal plate.

It can be seen therefore that the pulling force to remove the device from a metal plate, when pulled in the manner described above, is approximately that of pulling a single cell from the plate. In contrast, the removal force caused by objects attached to the device can be considerably higher, particularly if an object is arranged to attach to the attachment means of more than one cell simultaneously, and to lock the articulation between adjacent cells.

Similarly, the multiple cells attached to the metal plate will provide increased resistance to slip, e.g. due to gravity acting on a vertically mounted device, as compared to that provided by a single cell alone.

Figure 3:
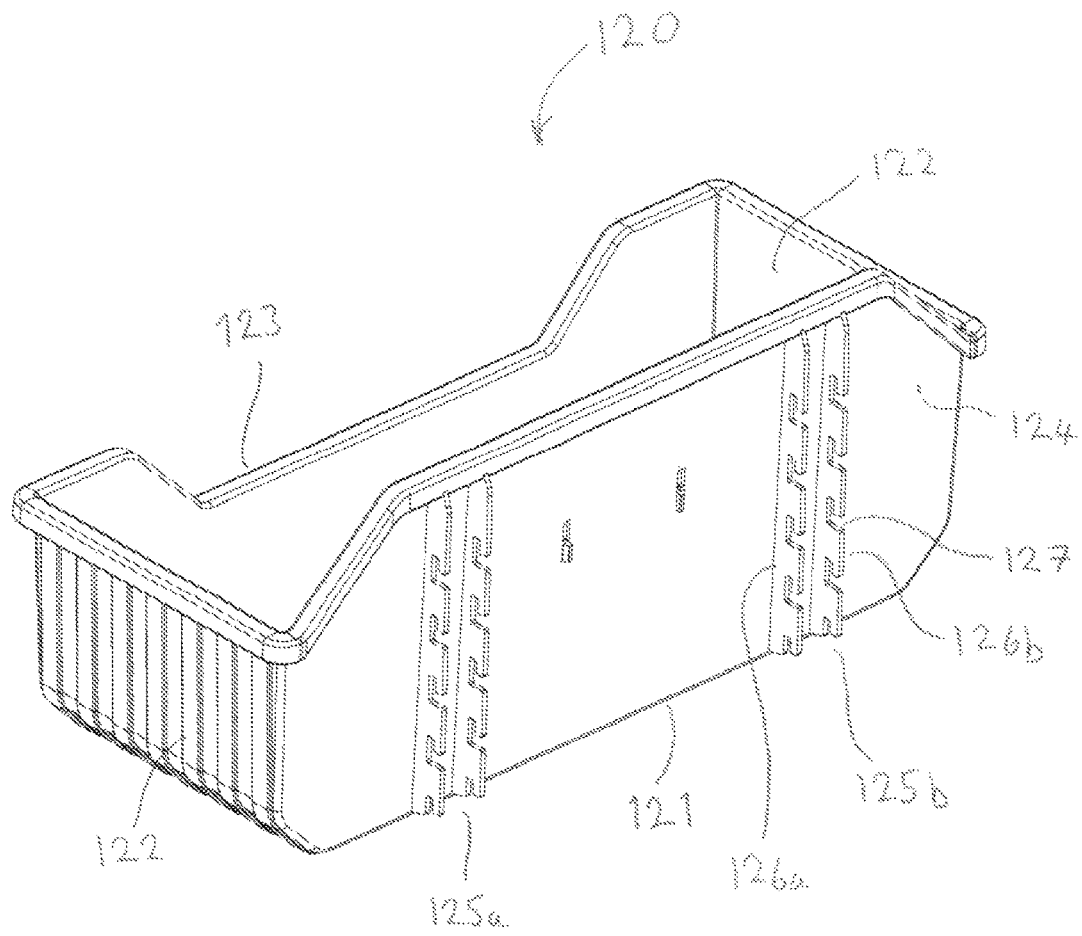
FIG. 3 diagrammatically illustrates a second embodiment of the invention comprising an article, in this case a shelving unit, having couplings for attachment to a magnetic strip of the type shown in FIGS. 1 and 2.
Figure 4:
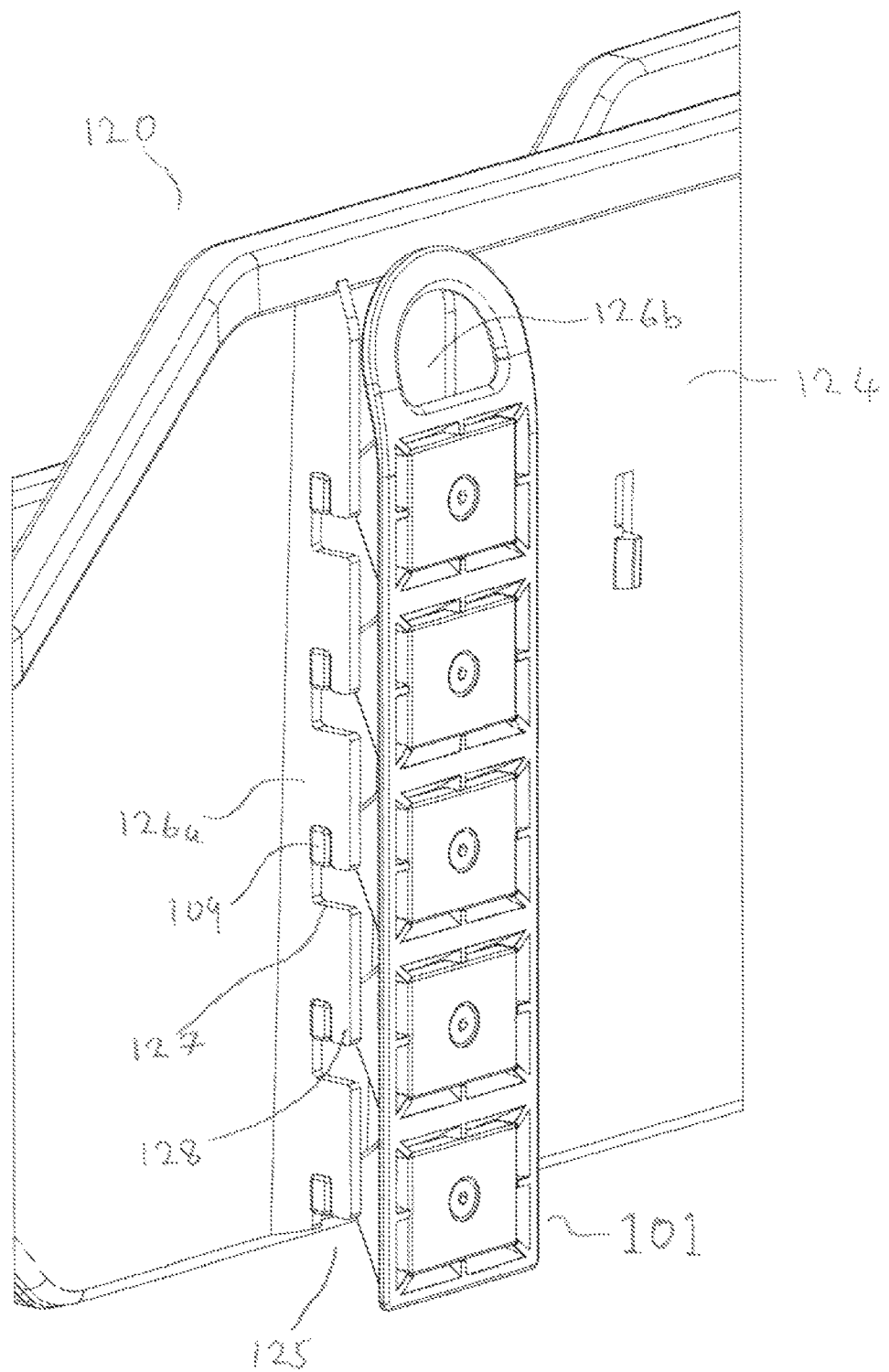
FIG. 4 diagrammatically illustrates a further view of the second embodiment, with a magnetic strip attached to the shelving unit.

Consequently, a second embodiment of the invention is now described, with reference to FIGS. 3 and 4. This comprises a pair of magnetic strips, each similar to that described in relation to FIGS. 1 and 2. It further comprises an associated article, in this case a shelf unit, arranged to attach to each cell on each strip.

Note that features or elements that are common between the various embodiments are shown with reference numerals that differ by 100, or a multiple thereof.

FIG. 3 shows a generally rearward view of a shelf unit 120, made from HDPE, and comprising a base 121, sidewalls 122, a lowered front wall 123 and a high back 124. The back has positioned thereon two sets of structures 125*a,b* adapted to couple to a pair of corresponding magnetic strip devices. Each structure 125 comprises of a pair of rails 126*a-b* having a series of shaped slots e.g. 127 that define a set of hooks for hanging onto the attachment means on the strip devices 101.

FIG. 4 shows a close-up view of one of the structures 125 on shelf 120, to which is coupled a magnetic strip 101. The attachment means on each cell of the magnetic strip devices each comprise a pair of lugs 109 as shown (at ref 9) most clearly in FIG. 1. The spacing between rails 126*a* and 126*b* is chosen to be slightly less than the spread of the lugs 109 on each cell. Thus the slots 127 on each rail are adapted to accommodate the lugs 109 on the attachment means of a cell, and the hooks 128 defined by the cut-outs hang at the rear of the lugs 109. Sideways movement of the shelf with respect to the magnetic strip 101 is prevented by the body (3, in FIG. 1) presenting a relatively snug fit in between each rail 126*a*, 126*b*.

The axial spacing between a pair of slots on a rail is chosen to correspond to the spacing between the attachment means on neighbouring cells of the magnetic strip device.

Installation of the shelf and the magnetic strip devices may be done as follows. First, the couplings on the magnetic strips 101 are attached to the corresponding couplings on the shelf, as is shown (for a single magnetic strip) in FIG. 4. The shelf, complete with the magnetic strips, is then brought towards the substrate at the desired mounting point. The magnets will then pull the shelf into position. Advantageously, the shelf may be tilted to present e.g. a lower end of the magnetic strips first to the substrate. This then helps to reduce the effect of the magnets all slamming into the substrate with their full force simultaneously, and so further helps to prevent damage thereto.

Alternatively, the magnetic strip devices may be attached first to the substrate, separately from the shelf, as follows. The devices are first attached to a suitable metal substrate, such as sheet steel, as found on the walls of vans etc. The strips are advantageously presented to the substrate cell by cell, to reduce the risk of damage to the substrate. They are oriented (generally vertically in this case) and spaced so as to match the pair of structures 125 on the shelf 120. The shelf is then brought to the strip devices 1 and the hooks formed by the slots are hung over corresponding lugs 9 of the strip devices. Thus each cell 2 of each strip device is coupled to a corresponding pair of hooks formed in the rails of the shelf. The connection of the shelf to the strip device prevents the cells from articulating with respect to the other cells, and so increases the force required to pull the strip from the substrate beyond that of removing a single cell.

Of course, it will be appreciated that these mounting procedures may be varied according to the particular circumstances, that may depend upon the object attached, or to be attached, to the magnetic strip(s).

It will be noted that, as the slots in a given rail are fixed in relation to each other, then any pull force applied to the shelf when mounted on a strip as described above will tend to be applied to all of the cells simultaneously. Thus each of the cells share the load of the shelf and its contents to some degree.

The embodiment shown in relation to FIGS. 3 and 4 use a pair of magnetic strip devices to hold a single shelf. It should be understood that other embodiments may use a different number of magnetic strips to hold a storage unit or other article. For example, some articles may require just a single magnetic strip device. Others may have the ability to use three, four, or even five or more, depending upon the weight of the article (including any contents thereof in the case of a storage unit) to be held.

Also, some embodiments may comprise one or more magnetic strips to which more than one article may be attached, such that each magnetic strip is supporting more than one article. The orientation of the magnetic strips in some embodiments may also differ from that shown in the examples above.

Other configurations within the scope of the invention will be apparent to the normally skilled person. For example, the coupling to other articles may vary from that shown whilst remaining within the scope of the present invention. Also, the materials used in the manufacture of embodiments of the invention may vary from those of the example presented above, as will be apparent to the normally skilled person. For example, other types of materials may be used, such as other polymers, including rubber or other types of plastic, or metals etc. and a person of ordinary skill in the art would appreciate the properties required for particular embodiments of the invention.

The functions described herein as provided by individual components could, where appropriate, be provided by a combination of components instead. Similarly, functions described as provided by a combination of components could, where appropriate, be provided by a single component.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. An attachment device comprising a plurality of cells, wherein each cell comprises a magnetic contact fixing for attaching the cell to a substrate, and wherein each cell is attached to at least one neighbouring cell by a region allowing articulation therebetween, wherein the device comprises an attachment coupling for attaching an associated article thereto, and further comprises means for mechanically locking a cell to the next, to disable the articulation therebetween and further wherein the means for mechanically locking each cell to the next comprises a plurality of attachment couplings on the associated article, in a fixed relationship to each other, each being arranged to couple to the attachment couplings on the device on at least two of the cells.

2. The attachment device as claimed in claim 1 wherein the articulation allows, when not locked, a degree of rotational movement of a cell about the articulation region.

3. The attachment device as claimed in claim 1 wherein the articulation between neighbouring cells is provided by a pliable region of material between said cells.

4. An attachment device comprising a plurality of cells, wherein each cell comprises a magnetic contact fixing for attaching the cell to a substrate, and wherein each cell is attached to at least one neighbouring cell by a region allowing articulation therebetween, wherein the device comprises an attachment coupling for attaching an associated article thereto, and further comprises means for mechanically locking a cell to the next, to disable the articulation therebetween wherein the articulation region comprises a hinge and wherein each cell is detachable from a neighbouring cell.

5. The attachment device as claimed in claim 1 wherein the plurality of cells are connected in a linear strip.

6. The attachment device as claimed in claim 1 wherein a handle is attached to at least one of the cells.

7. The attachment device as claimed in claim 1 wherein the magnet is a neodymium magnet.

8. The attachment device as claimed in claim 1 wherein the magnet is at least partially coated in an elastomer.

9. The attachment device as claimed in claim 1 wherein the plurality of cells are formed in part from a single moulding.

10. The attachment device as claimed in claim 9 wherein the single moulding further forms the articulated region(s) between cells.

11. An attachment device comprising a plurality of cells, wherein each cell comprises a magnetic contact fixing for attaching the cell to a substrate, and wherein each cell is attached to at least one neighbouring cell by a region allowing articulation therebetween, wherein the device comprises an attachment coupling for attaching an associated article thereto, and further comprises means for mechanically locking a cell to the next, to disable the articulation therebetween wherein the attachment coupling is located on each cell.

12. The attachment device as claimed in claim 1 wherein the attachment coupling comprises a pair of lugs that provide a platform onto which an article may be hooked or rested.

13. The attachment device as claimed claim 1 further comprising an associated article having a plurality of fixings adapted to engage with the or each attachment coupling.

14. The attachment device as claimed in claim 13 wherein the associated article is a storage unit.

15. The attachment device as claimed in claim 13 wherein the plurality of fixings on the associated article are in fixed relationship to each other.

* * * * *